F. C. SPAHN.
TIRE CHAIN CONTAINER.
APPLICATION FILED JUNE 18, 1917.
1,257,647.
Patented Feb. 26, 1918.
2 SHEETS—SHEET 2.
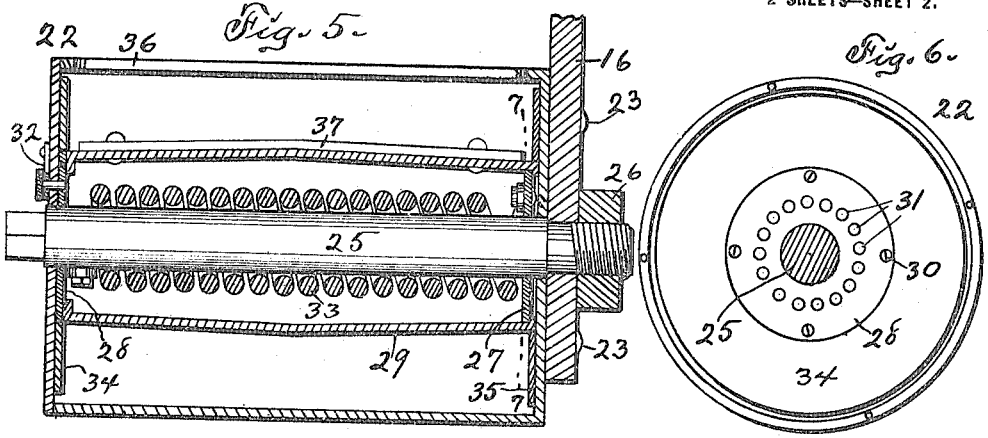
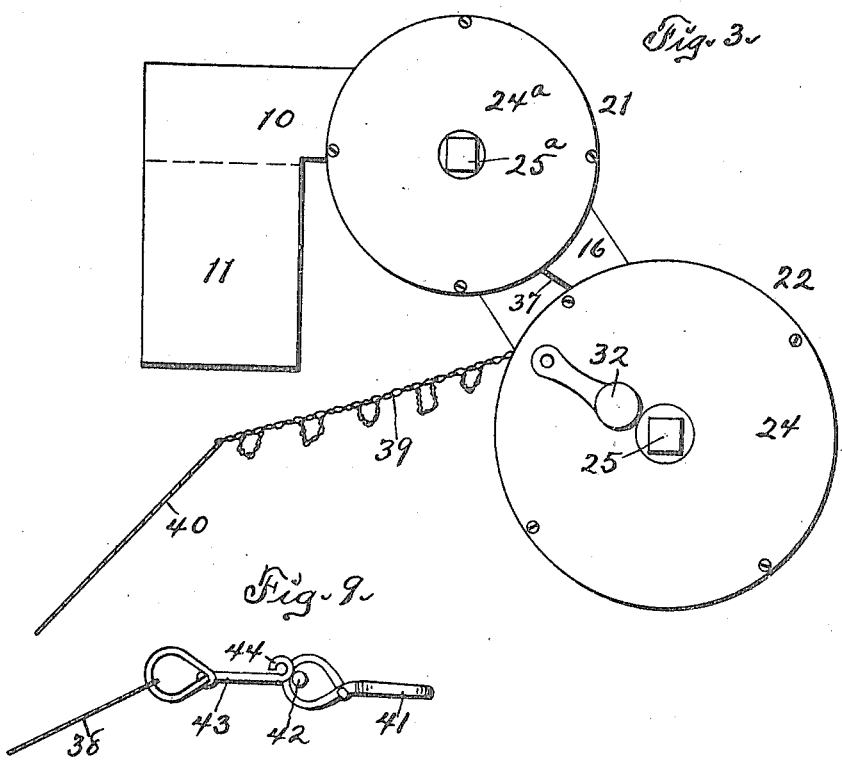
Inventor:
Fred C. Spahn.
By Silas L. Ewert
Atty

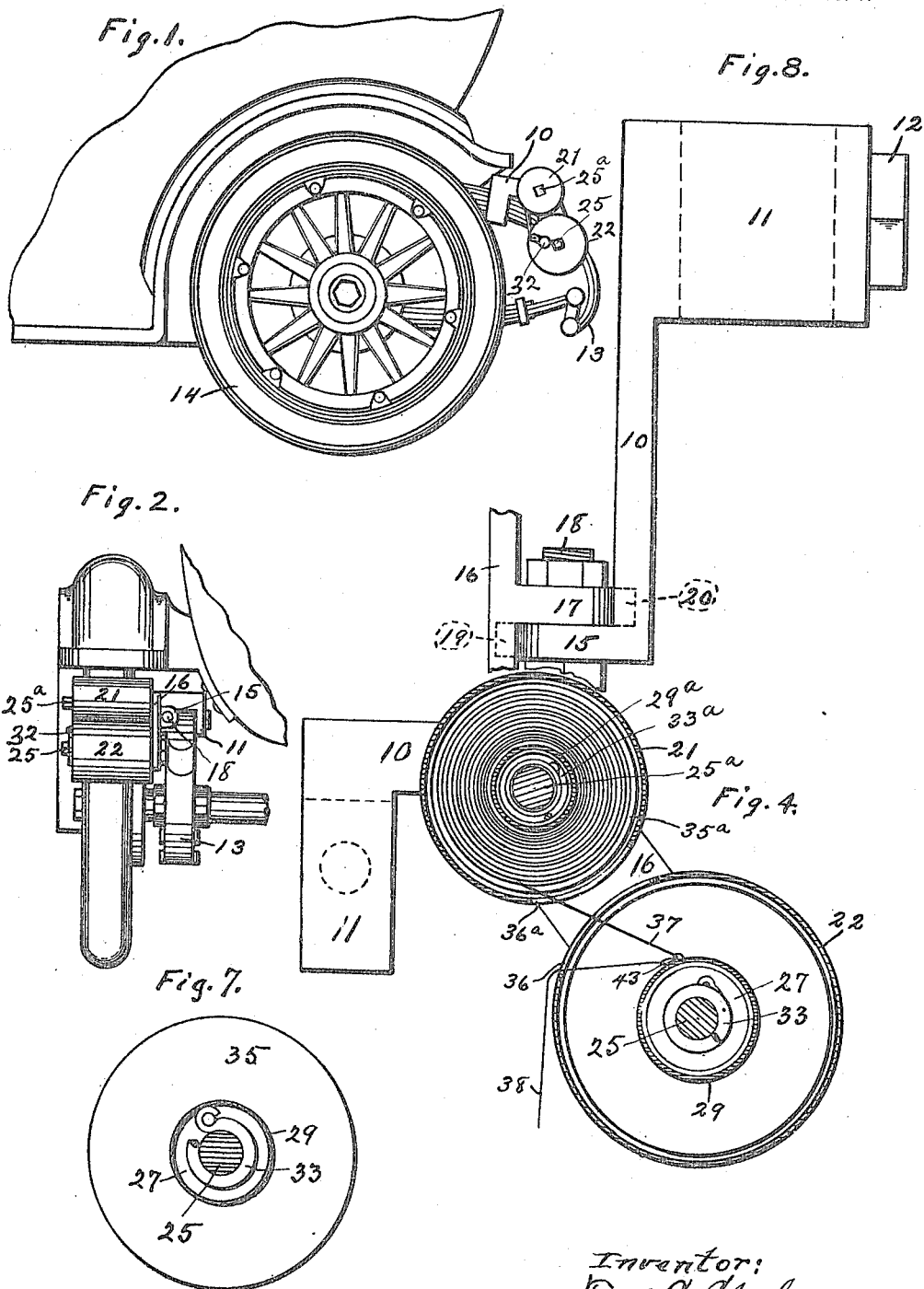

UNITED STATES PATENT OFFICE.

FRED C. SPAHN, OF SCHLESWIG, IOWA.

TIRE-CHAIN CONTAINER.

1,257,647.  Specification of Letters Patent.  Patented Feb. 26, 1918.

Application filed June 18, 1917. Serial No. 175,536.

*To all whom it may concern:*

Be it known that I, FRED C. SPAHN, a citizen of the United States of America, and resident of Schleswig, in Crawford county, Iowa, have invented a new and useful Tire-Chain Container, of which the following is a specification.

The object of this invention is to provide means for containing and carrying a tire chain and delivering said chain to and receiving the same from a wheel.

A further object of this invention is to provide means for automatically receiving and rolling within a container a tire chain mounted on and unwinding from a wheel.

A further object of this invention is to provide means for selectively positioning a tire chain container relative to a wheel.

A further object of this invention is to provide means for conjunctively winding, unwinding and containing a tire chain and a web.

A further object of this invention is to provide means for containing, winding and unwinding a web adapted to be employed in wound relation with a tire chain in a container at times.

A further object of this invention is to provide means for reducing friction between a tire chain and associated elements and the wall of a container.

A further object of this invention is to provide temporary means for detachably connecting a tire chain to a wheel.

A further object of this invention is to provide means for temporarily attaching a tire chain to a drum.

A further object of this invention is to provide strain-detachable safety means for attaching a tire chain to a drum.

A further object of this invention is to provide means for locking a spring-actuated drum against rotation.

My invention consists in the construction, arrangement and combination of elements hereinafter set forth, pointed out in my claims and illustrated by the accompanying drawing, in which—

Figure 1 is a side elevation illustrating a portion of a motor vehicle and one wheel, showing my improved device mounted as required for practical use. Fig. 2 is a rear end elevation of the devices shown in Fig. 1. Fig. 3 is a side elevation on an enlarged scale showing my improved devices detached from the car, a portion of a tire chain being shown externally of the container. Fig. 4 is an elevation on a different scale of the general devices shown in Fig. 3, part of such devices being shown in section. Fig. 5 is a longitudinal section of one chamber of the container. Fig. 6 is an end elevation, partly in section, of the container, the outermost end plate being removed. Fig. 7 is a cross-section on the indicated line 7—7 of Fig. 5, on a different scale. Fig. 8 is a plan, on an enlarged scale, of a supporting and pivoting bracket employed with the device. Fig. 9 is a detail view of a strain-detachable device employed to connect a chain to a drum, the same being shown generally on a smaller scale in Fig. 4.

In the construction of the device as shown the numeral 10 designates a bracket having a fork 11 offset to one side thereof and adapted to embrace and be attached by a set screw 12 to a suitable member of a motor car such as a spring 13. The bracket may be clamped or otherwise secured to any other suitable member of the car and it may be varied in size and shape as desired, retaining the function of carrying devices hereinafter described in desired relation to a wheel 14 of said car. The bracket 10 is formed with an ear 15 extending oppositely from the fork 11 and a supporting bar 16 is mounted approximately parallel with the bracket and is formed with an ear 17 parallel with and adapted to be pivoted by a bolt 18 to the first ear. Lugs or lips 19, 20 (dotted lines Fig. 8) are formed on the ears 15 and 17 respectively and are adapted to engage at times the bracket 10 and bar 16 and limit rotation of the bar relative to the bracket.

Containing cylinders, indicated generally by the numerals 21, 22, are fixed to the bar 16 in any suitable manner such as through the use of screws 23 (Fig. 5), said bar preferably crossing the ends of said cylinders diametrically. The cylinders 21, 22 form and constitute containers and preferably are of different diameters as indicated. The cylinder 22 is formed with a removable outer end portion 24. Registering holes are formed in the end portions of the cylinder 22 and the bar 16 and a bolt 25 is mounted therein and shouldered against the bar. A locking nut 26 is screwed on one end portion of the bolt 25 and, when tightened against the bar 16, locks said bolt against rotation in either direction. The opposite end portion of the bolt 25 is made angular in cross-section to receive a crank or wrench for the purpose of holding said bolt during the operation of tightening the nut 26 or turning said bolt in either direction when said nut is loosened. A drum having heads 27, 28, and a shell 29 suitably connected is mounted pivotally on the shaft 25 between the ends of the cylinder 22, said shaft passing loosely through the ends of the drum. The shell 29 of the drum preferably is of greater diameter at its center than at its ends to accommodate the elements wound thereon as hereinafter described. The head 28 of the drum preferably is detachably secured to the shell by screws 30 and said head is formed with an annular row of holes 31 concentric with the shaft 25. A detent device 32 is mounted on the end 24 of the cylinder 22 and is adapted to engage in one or another of the holes 31 and prevent rotation of the drum in either direction. The detent device is susceptible of manual actuation selectively to govern the locking position of the drum relative to its rotation on the shaft 25. A spiral spring 33 is mounted on the shaft 25 within the drum and one end of said spring is secured to the drum head 27 while the opposite end of said spring is secured to the shaft 25. It is the function of the spring 33 to rotate the drum in one direction on the shaft 25 and the tension of the spring may be adjusted by rotating the shaft 25 manually through the medium of a wrench or crank when the nut 26 is loosened, the drum being at the same time held against rotation by engagement of the detent device 32. Rings or washers 34, 35 are mounted in suitable rotary relations within the cylinder 22 and I have shown them pivoted on end portions of the drum and free to rotate thereon. It is the function of the rings or washers 34, 35 to prevent contact of devices wound on the drum with the ends of the cylinder and friction consequent to such contact. The cylinder 22 is formed with a slot 36 opening toward the wheel 14 and cylinder 21. The cylinder 21 is provided with a removable head 24$^a$, a shaft 25$^a$, a nut (not shown) like unto 26, a drum having heads like unto 27, 28 and a shell 29$^a$, and a spring 33$^a$ adapted to be adjusted as described in connection with the spring 33 and employed to rotate the drum in one direction. The cylinder 21 also is provided with rings or washers, one of which is shown and indicated by the numeral 35$^a$ in Fig. 4, adapted to prevent contact and friction between a device wound on the drum and the ends of the cylinder. The cylinder 21 also is provided with a slot 36$^a$ opposed to the slot 36 of the cylinder 22.

A web 37, preferably formed of a strip of canvas, is fixed at one end to and is adapted to be wound by the spring 33$^a$ on the shell of the drum in the cylinder 21 and said web is fixed at the opposite end to the shell 29 of the drum in the cylinder 22 and extends from one cylinder to the other through the slots 36, 36$^a$. The spring 33 is opposed and of superior strength to the spring 33$^a$. Two or more cords 38, one of which is shown in Fig. 4, are detachably secured to the shell 29 of the drum in the cylinder 22. The outer end portions of the cords 38 are adapted to be secured temporarily to one end portion of a tire chain 39, which tire chain extends through the slot 36 at times, and the opposite end portion of said chain carries one or more cords 40 adapted to be employed in attaching the chain temporarily to the wheel 14. The detachable connection between the cords 38 and drum shell 29 may be of any suitable construction and an illustration thereof is shown in Fig. 9, which comprises a link 41 adapted to be permanently secured to the drum shell and having one end thereof engaged with a cross arm 42 forming one end of an open link 43 to which one end of a cord 38 is attached permanently. One side bar of the link 43 terminates in an eye 44 in loose contact with the extremity of the cross arm 42. When any undue strain is applied to the cord 38 the cross arm 42 will spring away from the eye 44 into an inclined plane and permit the link 41 to withdraw from said cross arm, thus releasing the cord and elements straining thereon. The eye 44 is of advantage in manually connecting the link 41 to the cross arm 42.

In practical use the parts are assembled as shown and the web 37 and chain 39 are wound on the shell 29 of the drum in the cylinder 22 conjunctively, the web having the function of separating and preventing entangling connection between the parts of said chain. The operation of winding the web and chain conjunctively on the drum shell 29 effects an unwinding and storage of power in the spring 33$^a$ in the cylinder 21, which power is sufficient to rewind the web on the drum in the latter cylinder when the superior power of the spring 33 is in any manner withdrawn from the web. When the web and chain are conjunctively wound in the cylinder 22 the cord or cords 40 may extend through the slot 36 of said cylinder for convenience in withdrawing the chain therefrom and when the chain is stored in the cylinder 22 the containers are turned through an arc upwardly and inwardly relative to the motor car and out of alinement with the wheel 14, such turning being permitted by the pivotal connection of the bar 16 with the bracket 10; or the entire device may be removed from the car by release of the set screw 12. When it is desired to apply a chain 39 to the tire of the wheel 14, the containers are turned into the position shown in Figs. 1 and 2; the cord or cords 40 are manually secured to the rim of the wheel such as by tying the same around the tire and rim and between spokes of said wheel; the detent device 32 is detached or disengaged from the drum head 28 and the motor car is advanced a sufficient distance to withdraw the chain from the cylinder 22 and carry it around the tire progressively; and the detent 22 is engaged with the drum head 28; which done, the cords 38 are manually detached from the chain, the cord or cords 40 are manually detached from the chain and the ends of the chain are connected in whatever way may be provided by the manufacturer thereof. During this operation of unwinding the chain 39 from its drum and winding it on the tire of the wheel 14, the web 37 is wound on the drum in the cylinder 21 by the spring 33ª. When the chain 39 is in use on the wheel 14 the containers may be turned out of alinement with the wheel as above described for the purpose of removing them from the trajectory of mud and water which may be thrown rearwardly and upwardly in the travel of said wheel. When it is desired to remove the chain 39 from the wheel 14 the containers are turned back to the position shown in Figs. 1 and 2; the ends of the chain are detached from each other; the cords 38 are attached to the uppermost end of the chain; the cord or cords 40 are employed to secure the lowermost end of the chain to the wheel; the detent device 22 is detached from the drum head 28; and the car is reversed in travel so as to unwind the chain from the wheel and permit the same to be wound conjunctively with the web 37 on the drum in the cylinder 22; which done, the cords 40 are detached from the wheel and the detent device 32 is engaged with the drum head 28. Then the containers may be turned again into a position out of alinement with the wheel.

Any suitable means may be employed for detachably securing the chain to its drum, preferably retaining the characteristic of releasing the chain under any undue strain such as might be occasioned by driving the car forwardly greater than the predetermined distance required to wind the chain on the wheel.

Any suitable means may be employed for mounting the containers on the car and relative to the wheel.

Any number of containers may be employed on a car, being dependent on the number of chains carried and desired to be used on occasion.

Any suitable construction may be employed for either of the containers and the cylinder 21 and its drum mechanism may be omitted entirely from the apparatus if desired.

Any suitable detent connection or device may be employed for limiting rotation of the drum in the chain container.

I do not desire to be understood as limiting myself to any of the details of construction and arrangement herein shown and described as the same may be modified, within the scope of the appended claims, without departing from my invention.

I claim as my invention—

1. A tire-chain container, comprising a housing adapted to be mounted on a motor car, there being a drum provided in said housing, and means for winding a tire-chain on said drum.

2. A tire-chain container, comprising a housing adapted to be mounted on a motor car, there being a drum provided in said housing, and spring-actuated means for winding a tire-chain on said drum.

3. A tire-chain container, comprising a housing adapted to be mounted on a motor car, there being a drum provided in said housing, spring-actuated means for winding a tire-chain on said drum, and locking devices adapted to prevent rotation of said drum in either direction.

4. A tire-chain container, comprising a housing adapted to be mounted on a motor car, there being a drum provided in said housing, and means for winding a tire-chain on said drum, there being detachable connections between said tire-chain and drum.

5. A tire-chain container, comprising a housing adapted to be mounted on a motor car, there being a drum provided in said housing, spring-actuated means for winding a tire-chain on said drum, and detachable connections between said tire-chain and drum.

6. A tire-chain container, comprising a suitable pivotal support, housings mounted on said support parallel with each other, said housings being formed with communicating slots, drums mounted in said housings and spring-actuated in one direction respectively, a web secured to said drums and adapted to be wound on them alternately, and means for detachably connecting a tire-chain to one of said drums.

7. A tire-chain container, comprising a suitable pivotal support, housings mounted on said support parallel with each other, said housings being formed with communicating slots, drums mounted in said housings and spring-actuated in opposite directions, a web secured to said drums and adapted to be wound on them alternately, and means for detachably connecting a tire-chain to one of said drums.

8. A tire-chain container, comprising a suitable pivotal support, housings mounted on said support parallel with each other, said housings being formed with communicating slots, drums mounted in said housings and spring-actuated in opposite directions, a web secured to said drums and adapted to be wound on them alternately, and means for detachably connecting a tire-chain to one of said drums, the spring in one of the housings being materially superior in strength to the spring in the other housing.

9. A tire-chain container, comprising a suitable pivotal support, housings mounted on said support parallel with each other, said housings being formed with communicating slots, drums mounted in said housings and spring-actuated in opposite directions, a web secured to said drums and adapted to be wound on them alternately, means for detachably connecting a tire-chain to one of said drums, and detent devices controlling the rotation of one of said drums.

10. In a device of the class described, a housing, a shaft mounted for rotation therein and provided with locking means at one end and rotating means at the opposite end, a drum loosely mounted on said shaft within the housing, and a spring coiled on said shaft within the drum, one end of said spring being secured to the drum and the opposite end of said spring being secured to the shaft.

11. In a device of the class described, a housing, a shaft mounted for rotation therein and provided with locking means at one end and rotating means at the opposite end, a drum loosely mounted on said shaft within the housing, a spring coiled on said shaft within the drum, one end of said spring being secured to the drum and the opposite end of said spring being secured to the shaft, and rings loosely mounted on the ends of the drum and adapted to be engaged by devices wound on the drum.

12. In a device of the class described, a housing, a shaft mounted for rotation therein and provided with locking means at one end and rotating means at the opposite end, a drum loosely mounted on said shaft within the housing, a spring coiled on said shaft within the drum, one end of said spring being secured to the drum and the opposite end of said spring being secured to the shaft, and detent devices carried by the housing and adapted to engage the drum and prevent rotation thereof in either direction.

FRED C. SPAHN.

Copies of this patent may be obtained for five cents each, by addressing the "Commissioner of Patents, Washington, D. C."